United States Patent
Kawaguchi et al.

(10) Patent No.: US 11,808,346 B2
(45) Date of Patent: Nov. 7, 2023

(54) SHIFT RANGE CONTROL DEVICE

(71) Applicant: DENSO CORPORATION, Kariya (JP)

(72) Inventors: Yusaku Kawaguchi, Kariya (JP); Seiji Nakayama, Kariya (JP); Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/836,353

(22) Filed: Jun. 9, 2022

(65) Prior Publication Data

US 2022/0299108 A1 Sep. 22, 2022

Related U.S. Application Data

(63) Continuation of application No. PCT/JP2020/044866, filed on Dec. 2, 2020.

(30) Foreign Application Priority Data

Dec. 12, 2019 (JP) .................................. 2019-224194

(51) Int. Cl.
*F16H 61/12* (2010.01)
*F16H 61/32* (2006.01)

(52) U.S. Cl.
CPC ............ *F16H 61/12* (2013.01); *F16H 61/32* (2013.01); *F16H 2061/1224* (2013.01); *F16H 2061/1284* (2013.01); *F16H 2061/326* (2013.01)

(58) Field of Classification Search
CPC .. F16H 61/12; F16H 61/32; F16H 2061/1224; F16H 2061/1284; F16H 2061/326
See application file for complete search history.

(56) References Cited

U.S. PATENT DOCUMENTS

| | | | |
|---|---|---|---|
| 5,304,102 A * | 4/1994 | Narita | F16H 61/061 477/120 |
| 9,050,904 B2 | 6/2015 | Suzuki et al. | |
| 2013/0144478 A1 | 6/2013 | Suzuki et al. | |
| 2018/0045309 A1 * | 2/2018 | Kamada | F16H 63/3043 |
| 2018/0149268 A1 * | 5/2018 | Nakade | B60K 6/547 |

* cited by examiner

*Primary Examiner* — Edwin A Young
(74) *Attorney, Agent, or Firm* — Nixon & Vanderhye P.C.

(57) ABSTRACT

An ECU has a temperature detection unit that detects an actual temperature of the ECU, a temperature estimation unit that calculates an estimated temperature of the ECU, an abnormality determination unit for determining a presence or absence of a sign of abnormality, and a switching prohibition unit that prohibits the shift range switching in a predetermined case. The switching prohibition unit prohibits the shift range switching when there is no sign of abnormality in the temperature detection unit and the actual temperature is equal to or higher than a switching prohibition threshold, and prohibits the shift range switching when there is a sign of abnormality in the temperature detection unit and the estimated temperature is equal to or higher than a switching prohibition threshold. The temperature estimation unit calculates the estimated temperature based on a latest actual temperature in a normal period.

14 Claims, 9 Drawing Sheets

SHIFT RANGE CONTROL DEVICE

CROSS REFERENCE TO RELATED APPLICATIONS

This application is a continuation application of International Patent Application No. PCT/JP2020/044866 filed on Dec. 2, 2020, which designated the U.S. and based on and claims the benefits of priority of Japanese Patent Application No. 2019-224194 filed on Dec. 12, 2019. The entire disclosure of all of the above applications is incorporated herein by reference.

TECHNICAL FIELD

The present disclosure relates to a shift range control device.

BACKGROUND

A shift range control device that controls a motor connected to a shift range switching mechanism to switch a shift range of a vehicle is known.

SUMMARY

An object of the present disclosure is to provide a shift range control device capable of suppressing heat generation while suppressing excessive shift range switching prohibition.

A shift range control device of the present disclosure includes a temperature detection unit that detects an actual temperature of the shift range control device, a temperature estimation unit that calculates an estimated temperature of the shift range control device, an abnormality determination unit that determination a presence or absence of a sign of abnormality, and a switching prohibition unit that prohibits a shift range switching in a predetermined case. The switching prohibition unit prohibits the shift range switching when there is no sign of abnormality in the temperature detection unit and the actual temperature is equal to or higher than a predetermined switching prohibition threshold, and prohibits the shift range switching when there is a sign of abnormality in the temperature detection unit and the estimated temperature is equal to or higher than a switching prohibition threshold.

Assuming that a period in which it is determined that there is no sign of abnormality in the temperature detection unit is a normal period, the temperature estimation unit calculates the estimated temperature based on the latest actual temperature in the normal period.

BRIEF DESCRIPTION OF DRAWINGS

The above and other objects, features and advantages of the present disclosure will become more apparent from the following detailed description made with reference to the accompanying drawings.

In the drawings.

DETAILED DESCRIPTION

Figure 1:
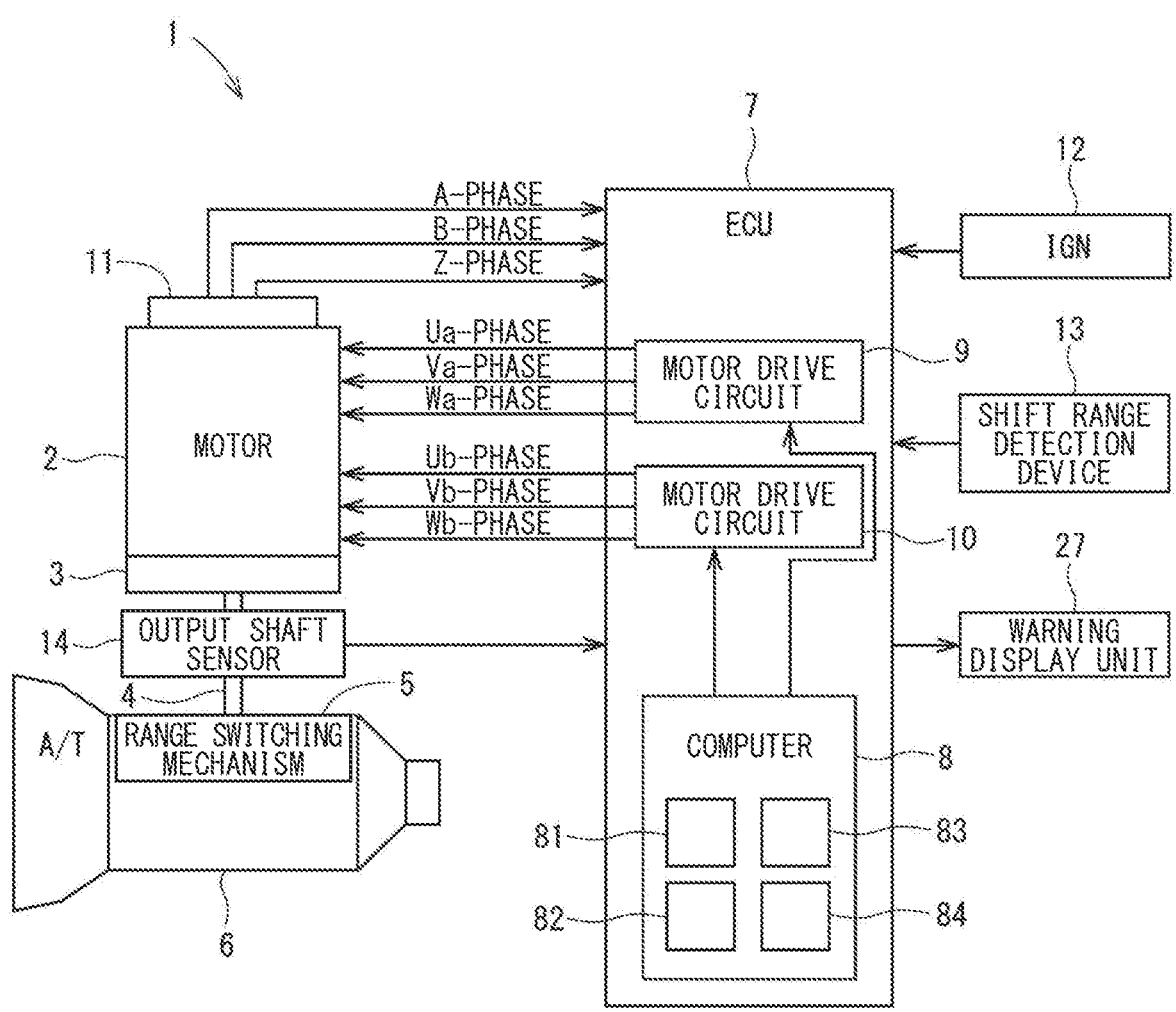
FIG. 1 is a diagram explaining a shift-by-wire system to which a shift range control apparatus of a first embodiment is applied.

In an assumable example, a shift range control device that controls a motor connected to a shift range switching mechanism to switch a shift range of a vehicle is known. An electronic control unit of the shift range switching device estimates a temperature of the electronic control unit, and prohibits or suppresses an operation of the electronic control unit and a motor when the estimated temperature reaches a predetermined temperature so as to suppress heat generation in the electronic control unit.

A present discloser considers that the electric control unit performs a heat generation suppression control based on an actual measured temperature obtained from a temperature detection unit, calculates an estimated temperature, and switches from the measured temperature to the estimated temperature to perform the heat generation suppression control, when the temperature detection unit is abnormal.

However, when the shift range is switched multiple times under the condition that the measured temperature is low and the estimated temperature becomes high, and the estimated temperature exceeds a switching prohibited temperature, if the temperature detection unit becomes abnormal, the shift range switching is prohibited even under the temperature condition in which the shift range can be switched.

The present disclosure has been made in view of the above points, and an object of the present disclosure is to provide a shift range control device capable of suppressing heat generation while suppressing excessive shift range switching prohibition.

A shift range control device of the present disclosure includes a temperature detection unit that detects an actual temperature of the shift range control device, a temperature estimation unit that calculates an estimated temperature of the shift range control device, an abnormality determination unit that determination a presence or absence of a sign of abnormality, and a switching prohibition unit that prohibits a shift range switching in a predetermined case. The switching prohibition unit prohibits the shift range switching when there is no sign of abnormality in the temperature detection unit and the actual temperature is equal to or higher than a predetermined switching prohibition threshold, and prohibits the shift range switching when there is a sign of abnormality in the temperature detection unit and the estimated temperature is equal to or higher than a switching prohibition threshold.

Assuming that a period in which it is determined that there is no sign of abnormality in the temperature detection unit is a normal period, the temperature estimation unit calculates the estimated temperature based on the latest actual temperature in the normal period.

As a result, by calculating the estimated temperature with high accuracy, it is possible to suppress the situation where the shift range switching is actually prohibited even under the temperature conditions in which the shift range can be switched. Therefore, it is possible to suppress excessive shift range switching while suppressing heat generation.

Hereinafter, a plurality of embodiments of a shift range control device will be described with reference to the drawings. In the embodiments, components which are substantially similar to each other are denoted by the same reference numerals and redundant description thereof is omitted.

First Embodiment

The shift range control device (hereinafter referred to as "ECU") of a first embodiment is applied to a shift-by-wire system of a vehicle. As shown in FIG. 1, a shift-by-wire system 1 is a system that electrically controls a range switching mechanism 5 of an automatic transmission 6.

<Shift-by-Wire System>

First, the shift-by-wire system 1 will be described with reference to FIGS. 1 and 2. The shift-by-wire system 1 includes an actuator including a motor 2 and a speed reducer 3. Based on a rotation angle of an output shaft 4 connected to the speed reducer 3, the range switching mechanism 5 sets a shift range of the automatic transmission 6 to a parking range (that is, P range), a reverse range (that is, R range), a neutral range (that is, N range), and a drive range (that is, D range).

An ECU 7 creates a three-phase alternating current by the motor drive circuits 9 and 10 based on a command signal of a computer 8 (hereinafter referred to as a computer), and supplies the current to the motor 2. The ECU 7 includes two motor drive circuits 9 and 10. A stator (not shown) constituting the motor 2 includes two systems of three-phase coils (not shown). One motor drive circuit 9 supplies a current to one of the three-phase coils (Ua phase, Va phase, Wa phase). Further, the other motor drive circuit 10 supplies a current to the other three-phase coil (Ub phase, Vb phase, Wb phase). As a result, even if one of the motor drive circuits 9 fails, the motor 2 can be driven by the other motor drive circuit 10.

An encoder 11 for detecting a rotation angle of a rotor is attached to the motor 2. The encoder 11 is, for example, a magnetic rotary encoder, and outputs A-phase, B-phase, and Z-phase pulse signals to the ECU 7 in synchronization with the rotation of the rotor. The computer 8 counts the rising and falling edges of the A-phase signal, switches the energized phases energizing the three-phase coil of the motor 2 in a predetermined order by the motor drive circuits 9 and 10 according to the count value, and drives the motor 2 to rotate. The Z-phase signal is used to detect a reference rotation angle of the rotor.

When the driver turns on an ignition switch 12, electric power is supplied to the ECU 7. Then, the computer 8 performs initial learning for associating the count value of the encoder 11 with an actual rotation position of the rotor. In the initial learning, the motor 2 is rotated in a forward rotation direction or a reverse rotation direction to synchronize the rotation position of the rotor with the energized phase.

When the driver operates the shift lever after the ignition switch 12 is turned on, a shift range detection device 13 detects an operation position of the shift lever. The shift range detection device 13 outputs a signal of the required shift range according to the operation position of the shift lever to the ECU 7. The computer 8 sets a target rotation angle of the rotor corresponding to the required shift range, and starts energizing the motor 2 so as to reach the count target value of the encoder 11 corresponding to the target rotation angle. Then, the computer 8 feedback-controls the motor 2 so that the motor 2 stops at a position where the count value of the encoder 11 matches the target value.

The output shaft 4 is provided with an output shaft sensor 14. The output shaft sensor 14 is composed of, for example, a potentiometer, and detects the rotation angle of the output shaft 4. It is possible to confirm the current shift range of the automatic transmission 6 from the rotation angle of the motor 2 detected by the output shaft sensor 14.

Figure 2:
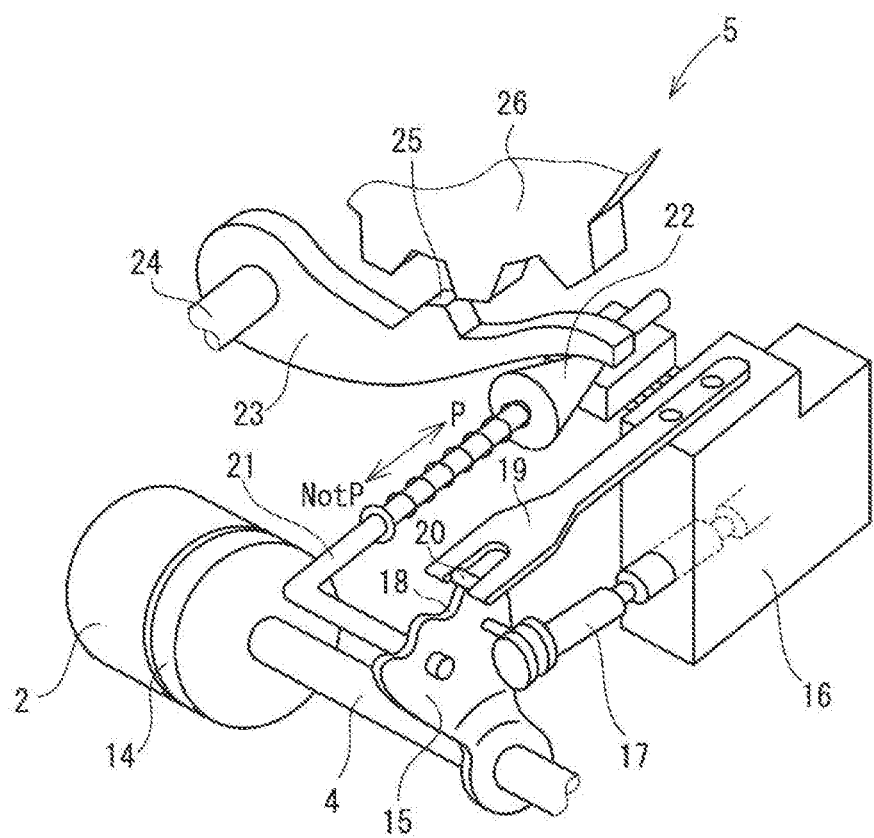
FIG. 2 is a perspective view of the shift range switching mechanism in FIG. 1.

As shown in FIG. 2, a substantially fan-shaped detent lever 15 is fixed to the output shaft 4. A spool valve 17 of a manual valve 16 is connected to the detent lever 15. When the motor 2 rotates the detent lever 15 and a position of the spool valve 17 is switched accordingly, the range of the automatic transmission 6 is switched to any of the P range, the R range, the N range, and the D range. Hereinafter, the shift range other than the "P" range is referred to as a "notP" range.

The detent lever 15 is provided with a plurality of recesses 18 corresponding to each shift range. An engaging portion 20 at a tip of a detent spring 19 is fitted into the recess 18, so that the detent lever 15 is held at a position corresponding to each shift range. As a result, the spool valve 17 is held at the position of the required shift range.

Further, an L-shaped parking rod 21 is connected to the detent lever 15. A conical body 22 provided at the tip of the parking rod 21 is in contact with a lock lever 23. The lock lever 23 can move up and down around its own rotation shaft 24. When the motor 2 rotates the detent lever 15 and the conical body 22 moves in a direction of the rotation axis of the lock lever 23 accordingly, the lock lever 23 moves up and down about the rotation axis 24.

When the shift range is the "P" range, the parking rod 21 moves in a direction approaching the lock lever 23, and a large diameter portion of the conical body 22 pushes up the lock lever 23. As a result, a convex portion 25 of the lock lever 23 fits into a parking gear 26. When the parking gear 26 is locked by the convex portion 25 of the lock lever 23, the rotation of the drive wheels of the vehicle is stopped and the vehicle is held in a parking state.

When the shift range is the "notP" range, the parking rod 21 moves away from the lock lever 23, and the large diameter portion of the conical body 22 comes out of the lock lever 23. As a result, when the convex portion 25 of the lock lever 23 is disengaged from the parking gear 26 and the parking gear 26 is unlocked, the vehicle is kept in a traveling state.

<ECU Function>

Next, the function of the ECU 7 will be described with reference to FIG. 1. As shown in FIG. 1, the ECU 7 includes a temperature detection unit 81, a temperature estimation unit 82, an abnormality determination unit 83, and a switching prohibition unit 84 as functional units for suppressing heat generation of the ECU 7.

The temperature detection unit 81 has a temperature element such as a thermistor, and detects an actual temperature Tac (that is, the actual temperature) of the ECU 7. The actual temperature Tac is, for example, the temperature of a substrate inside the ECU 7. In the first embodiment, the temperature detection unit 81 has two thermistors.

The abnormality determination unit 83 determines whether or not there is a sign of abnormality in the temperature detection unit 81. In the first embodiment, the abnormality determination unit 83 determines that there is a sign of abnormality in the temperature detection unit 81 when a detection difference ΔTac of the actual temperatures Tac1 and Tac2 by the two thermistors is equal to or higher than a predetermined abnormality determination value X . . . . Further, when the detection difference ΔTac is smaller than the abnormality determination value X, the abnormality determination unit 83 determines that there is no sign of abnormality in the temperature detection unit 81.

Further, the abnormality determination unit 83 determines a abnormal state of the temperature detection unit 81 when the state in which there is a sign of abnormality in the temperature detection unit 81 continues for a predetermined time T1 or more. When the abnormal state in the temperature detection unit 81 is confirmed, a warning display unit 27 alerts the driver.

The temperature estimation unit 82 calculates an estimated temperature Tes of the ECU 7. Specifically, the temperature estimation unit 82 calculates the estimated temperature Tes based on the latest actual temperature Tac in the period (hereinafter referred to as the normal period) in which it is determined that "there is no sign of abnormality in the temperature detection unit 81". That is, when the temperature estimation unit 82 determines that "there is no sign of abnormality in the temperature detection unit 81", the temperature estimation unit 82 calculates the estimated temperature Tes based on the current actual temperature Tac, and also when the temperature estimation unit 82 determines that "there is the sign of abnormality in the temperature detection unit 81", the temperature estimation unit 82 calculates the estimated temperature Tes based on the actual temperature Tac immediately before the abnormal sign occurs. At this time, the actual temperature Tac used by the temperature estimation unit 82 is the higher of the actual temperatures Tac1 and Tac2 by the two thermistors.

When the temperature estimation unit 82 determines that "there is no sign of abnormality in the temperature detection unit 81", the temperature estimation unit 82 substitutes the latest actual temperature Tac into the estimated temperature Tes, and constantly updates the estimated temperature Tes to the latest actual temperature Tac.

When the temperature estimation unit 82 determines that "there is a sign of abnormality in the temperature detection unit 81", the temperature estimation unit 82 performs an addition/subtraction process of the estimated temperature Tes without substituting the actual temperature Tac into the estimated temperature Tes (That is, stopping the substitution of the actual temperature Tac into the estimated temperature Tes). In the addition/subtraction process, a rising temperature of the ECU 7 due to the energization of the motor is added to the estimated temperature Tes, or a falling temperature of the ECU 7 due to the non-energizing of the motor is subtracted from the estimated temperature Tes according to the energized state of the motor 2.

As disclosed in Japanese Patent No. 5477437 (the entirely of the disclosure of JP Patent No. 5477437 is incorporated herein by reference), the content of the addition/subtraction process is that the rising temperature and the falling temperature of the ECU 7 can be changed according to the estimated temperature Tes, the rising temperature and the falling temperature of the ECU 7 can be changed according to the drive mode of the motor 2, the rising temperature and the falling temperature of the ECU 7 can be changed according to whether it is at the time of initial learning or at the time of performing the shift range switching based on the request, and the current estimated temperature Tes can be held without subtracting the lowering temperature according to a motor non-energization time.

The switching prohibition unit 84 prohibits the shift range switching based on the determination temperature Tde, and cancels the prohibited state. The determination temperature Tde is selected from the actual temperature Tac and the estimated temperature Tes according to the presence or absence of an abnormality sign of the temperature detection unit 81.

Specifically, the switching prohibition unit 84 substitutes the actual temperature Tac into the determination temperature Tde when "there is no sign of abnormality in the temperature detection unit 81". Then, the switching prohibition unit 84 prohibits the shift range switching when "there is no sign of abnormality in the temperature detection unit 81" and the determination temperature Tde is equal to or higher than the predetermined switching prohibition threshold value Tth1.

Further, the switching prohibition unit 84 substitutes the estimated temperature Tes into the determination temperature Tde when "there is a sign of abnormality in the temperature detection unit 81". Then, the switching prohibition unit 84 prohibits the shift range switching when "there is a sign of abnormality in the temperature detection unit 81" and the determination temperature Tde is equal to or higher than the switching prohibition threshold value Tth1.

The shift range switching prohibition state is canceled when the determination temperature Tde is equal to or less than the switching cancellation threshold Tth2. The process content after the abnormality of the temperature detection unit 81 is confirmed is the same as the case where "there is a sign of the abnormality of the temperature detection unit 81".

<Process Executed by ECU>

Figure 3:
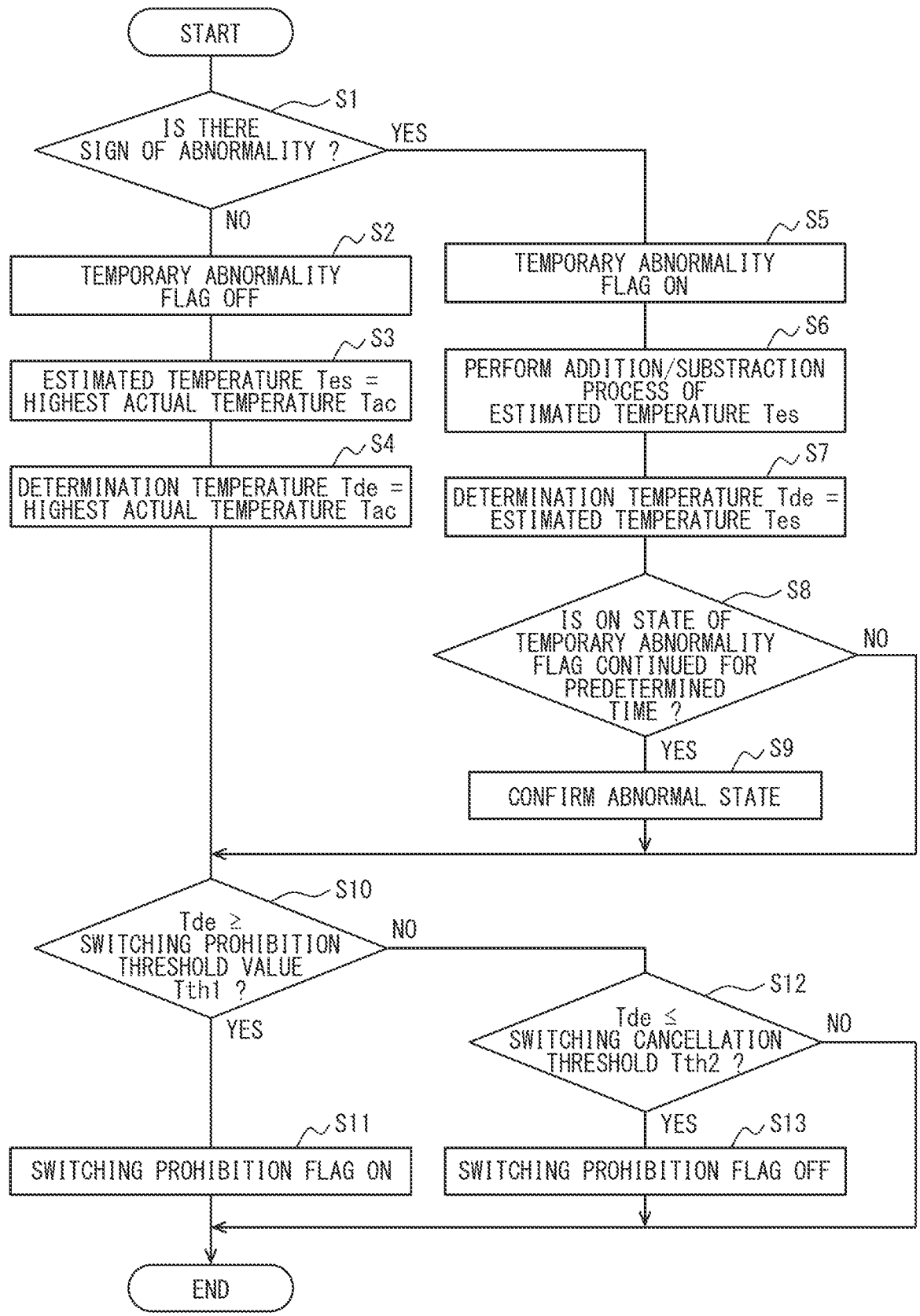
FIG. 3 is a flowchart illustrating a process executed by the shift range control device of FIG. 1.

Next, a series of processes executed by the ECU 7 for suppressing heat generation will be described with reference to FIG. 3. The series of processes shown in FIG. 3 is repeatedly executed when the ignition switch 12 is turned on. It is assumed that the latest value of the actual temperature Tac is always obtained. In the following description, "S" means a step.

When the process of FIG. 3 is started, it is determined in S1 whether or not there is a sign of abnormality in the temperature detection unit 81. If there is no sign of abnormality in the temperature detection unit 81, the process proceeds to S2. If there is a sign of abnormality in the temperature detection unit 81, the process proceeds to S5.

In S2, a "temporary abnormality flag" indicating the presence or absence of a sign of abnormality in the temperature detection unit 81 is turned off. In S3 following S2, the actual temperature Tac (that is, the higher of the actual temperatures Tac1 and Tac2 by the two thermistors) is substituted into the estimated temperature Tes. In S4 following S3, the actual temperature Tac is substituted into the determination temperature Tde. After S4, the process proceeds to S10.

In S5, the "temporary abnormality flag" is turned on. In S6 following S5, the addition/subtraction process of the estimated temperature Tes is performed. In S7 following S6, the estimated temperature Tes is substituted into the determination temperature Tde.

In S8 following S7, it is determined whether or not an on state of the "temporary abnormality flag" has continued for a predetermined time T1 or more. When the on state of the "temporary abnormality flag" continues for the predetermined time T1 or more, the process proceeds to S9. In S9, the abnormal state of the temperature detection unit 81 is confirmed, and the warning display unit 27 alerts the driver. If the on state of the "temporary abnormality flag" has not continued for the predetermined time T1 or more in S8, the process proceeds to S10.

In S10, it is determined whether or not the determination temperature Tde is equal to or higher than the switching prohibition threshold Tth1. When the determination temperature Tde is equal to or higher than the switching prohibition threshold Tth1, the process proceeds to S11. In S11, the "switching prohibition flag" is turned on in order to prohibit the shift range switching. After S11, the process exits the routine of FIG. 3.

When the determination temperature Tde is smaller than the switching prohibition threshold Tth1 in S10, the process proceeds to S12. In S12, it is determined whether or not the determination temperature Tde is equal to or less than the switching cancellation threshold value Tth2. When the determination temperature Tde is equal to or less than the switching cancellation threshold Tth2, the process proceeds to S13. In S13, the "switching prohibition flag" is turned off in order to cancel the shift range switching prohibition. After S13 and when the determination temperature Tde is larger than the switching cancellation threshold Tth2 in S12, the process exits the routine of FIG. 3.

Specific Operation Example

Next, an example of an operation by the ECU 7 will be described with reference to FIGS. 4 and 9. At time to in FIG. 4, both the "temporary abnormality flag" and the "switching prohibition flag" are off. At time t1, the detection difference ΔTac becomes the abnormality determination value X or more, and the "temporary abnormality flag" is turned on. A period from time t0 to immediately before time t1 is a normal period. At the time t2 when a predetermined time T1 or more has elapsed from the time t1, the abnormal state of the temperature detection unit 81 is determined.

In the normal period from the time t0 to immediately before the time t1, the actual temperature Tac1 which is the higher of the actual temperatures Tac1 and Tac2 by the two thermistors is substituted into the estimated temperature Tes. At time t1, the substitution of the actual temperature Tac into the estimated temperature Tes is stopped.

Figure 9:
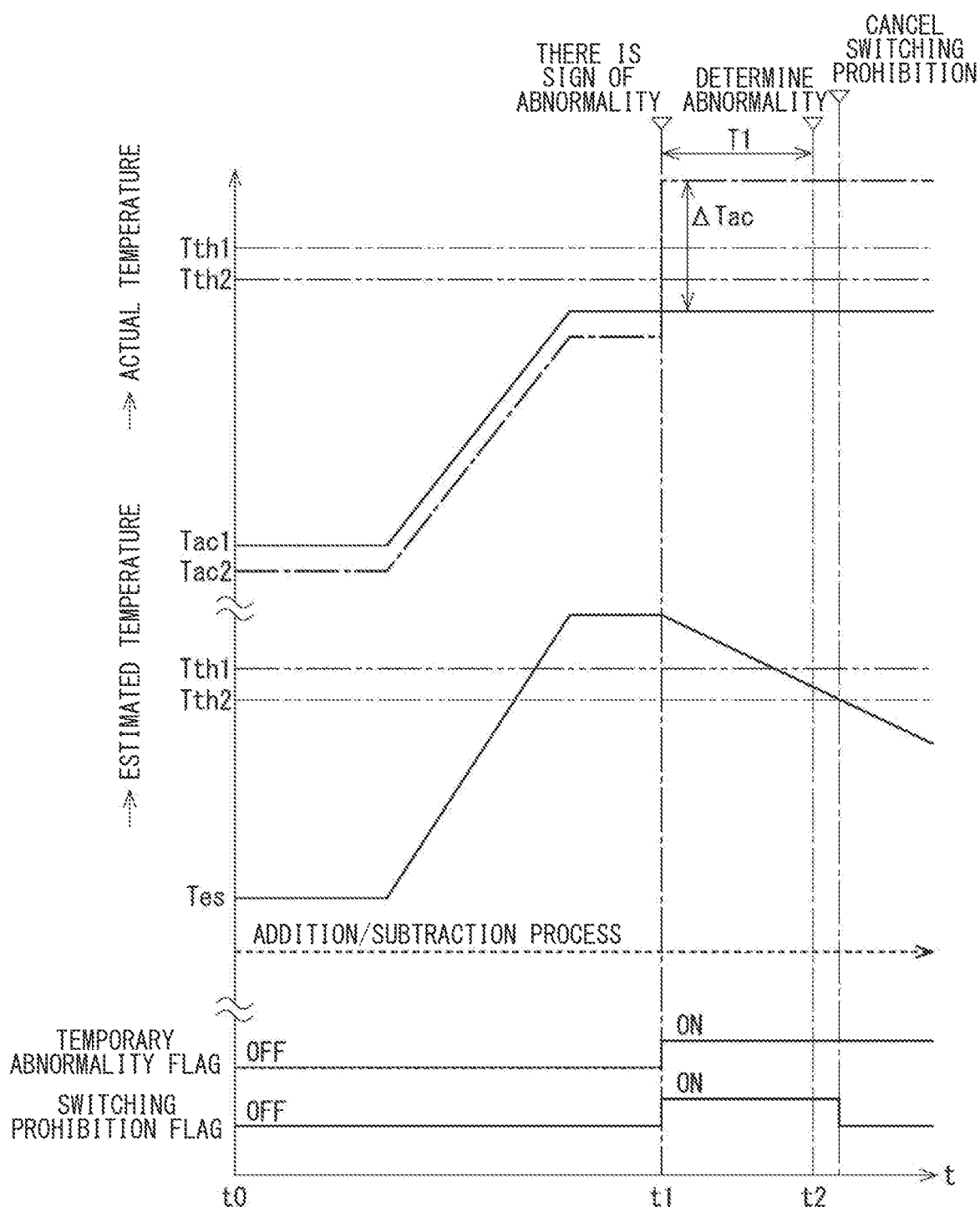
FIG. 9 is a time chart illustrating an example of the operation of the shift range control device according to a comparative embodiment.

Here, in a comparative embodiment shown in FIG. 9, the estimated temperature Tes is calculated in parallel with the calculation of the actual temperature Tac from before time t1. Then, when the determination criterion of the abnormality determination unit 83 is switched from the actual temperature Tac to the estimated temperature Tes at time t1 in a state where the estimated temperature Tes exceeds the switching prohibition threshold Tth1, the shift range switching is prohibited despite the temperature condition under which the shift range switching is possible.

Figure 4:
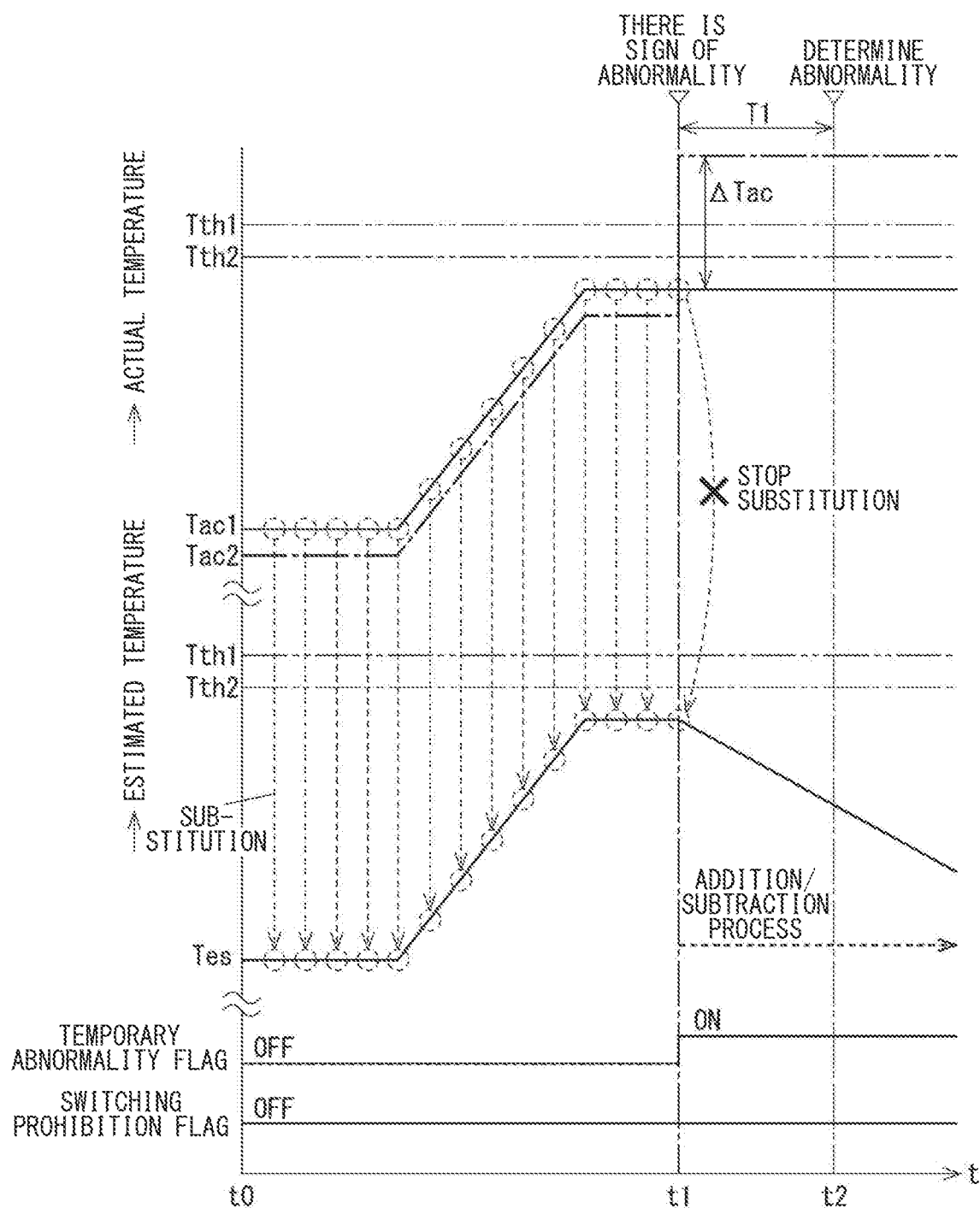
FIG. 4 is a time chart illustrating an example of an operation of the shift range control device of FIG. 1.

On the other hand, in the first embodiment shown in FIG. 4, the estimated temperature Tes immediately before the time t1 is the same as the actual temperature Tac. After time t1, the addition/subtraction process is performed to a substantially accurate temperature to calculate the estimated temperature Tes. As a result, the estimated temperature Tes is calculated with high accuracy, and the shift switching prohibition is determined in a state close to the actual temperature condition.

<Effect>

As described above, in the first embodiment, the ECU 7 has the temperature detection unit 81 that detects the actual temperature Tac of the ECU 7, the temperature estimation unit 82 that calculates the estimated temperature Tes of the ECU 7, the abnormality determination unit 83 for determining the presence or absence of the sign of abnormality, and the switching prohibition unit 84 that prohibits the shift range switching in a predetermined case. The switching prohibition unit 84 prohibits the shift range switching when there is no sign of abnormality in the temperature detection unit 81 and the actual temperature is equal to or higher than the switching prohibition threshold Tth1, and prohibits the shift range switching when there is a sign of abnormality in the temperature detection unit 81 and the estimated temperature Tes is equal to or higher than the switching prohibition threshold Tth1.

Assuming that the period in which it is determined that there is no sign of abnormality in the temperature detection unit 81 is the normal period, the temperature estimation unit 82 calculates the estimated temperature Tes based on the latest actual temperature Tac in the normal period.

As a result, by calculating the estimated temperature Tes with high accuracy, it is possible to suppress the situation where the shift range switching is actually prohibited even under the temperature conditions in which the shift range can be switched. Therefore, it is possible to suppress excessive shift range switching while suppressing heat generation.

Further, in the first embodiment, the temperature estimation unit 82 substitutes the latest actual temperature Tac into the estimated temperature Tes when it is determined that there is no sign of abnormality in the temperature detection unit 81. Further, when it is determined that there is a sign of abnormality in the temperature detection unit 81, without substituting the actual temperature Tac into the estimated temperature Tes, the temperature estimation unit 82 adds the rising temperature of the ECU 7 due to the energization of the motor to the estimated temperature Tes or subtracts the falling temperature of the ECU 7 due to the non-energization of the motor from the estimated temperature Tes according to the energized state of the motor 2. As a result, the estimated temperature Tes can be calculated accurately by preventing the erroneous substitution process of the actual temperature Tac.

In the first embodiment, the temperature detection unit 81 has two thermistors. The temperature estimation unit 82 calculates the estimated temperature Tes based on the highest actual temperature Tac among the latest actual temperatures Tac1 and Tac2 by the two thermistors in the normal period. Even when there are variations in the detection temperature due to individual differences in the thermistors, heat generation can be reliably suppressed.

In the first embodiment, the temperature detection unit 81 has two thermistors. The abnormality determination unit 83 determines that there is a sign of abnormality in the temperature detection unit 81 when a detection difference ΔTac of the actual temperatures Tac1 and Tac2 by the two thermistors is equal to or higher than the abnormality determination value X. As a result, the estimated temperature Tes can be calculated accurately by preventing the erroneous substitution process of the actual temperature Tac.

Further, in the first embodiment, the abnormality determination unit 83 determines a abnormal state of the temperature detection unit 81 when the state in which there is a sign of abnormality in the temperature detection unit 81 continues for a predetermined time T1 or more. As a result, erroneous abnormality detection can be suppressed.

Second Embodiment

Figure 5:
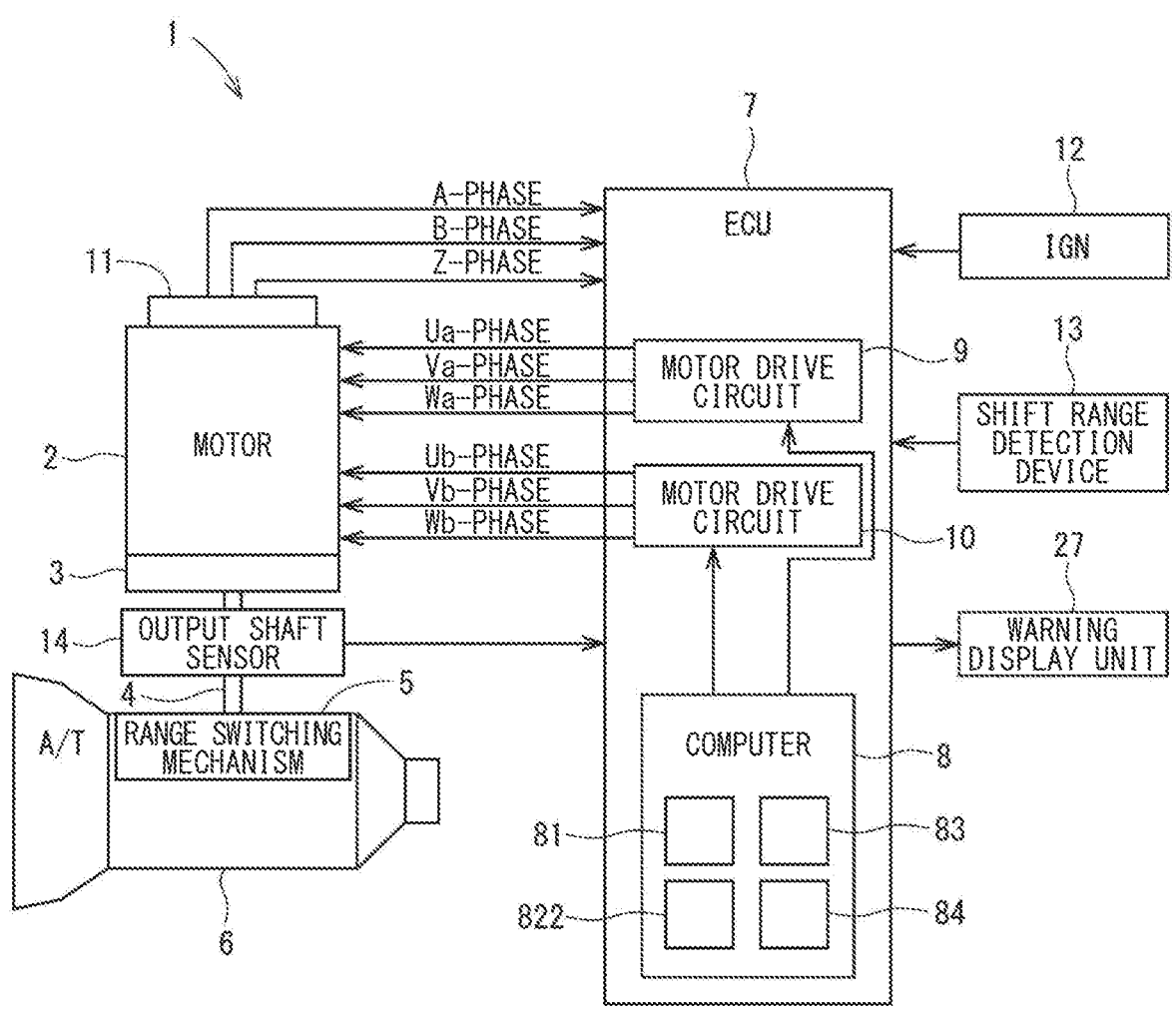
FIG. 5 is a diagram showing a shift range control device according to a second embodiment.
Figure 6:
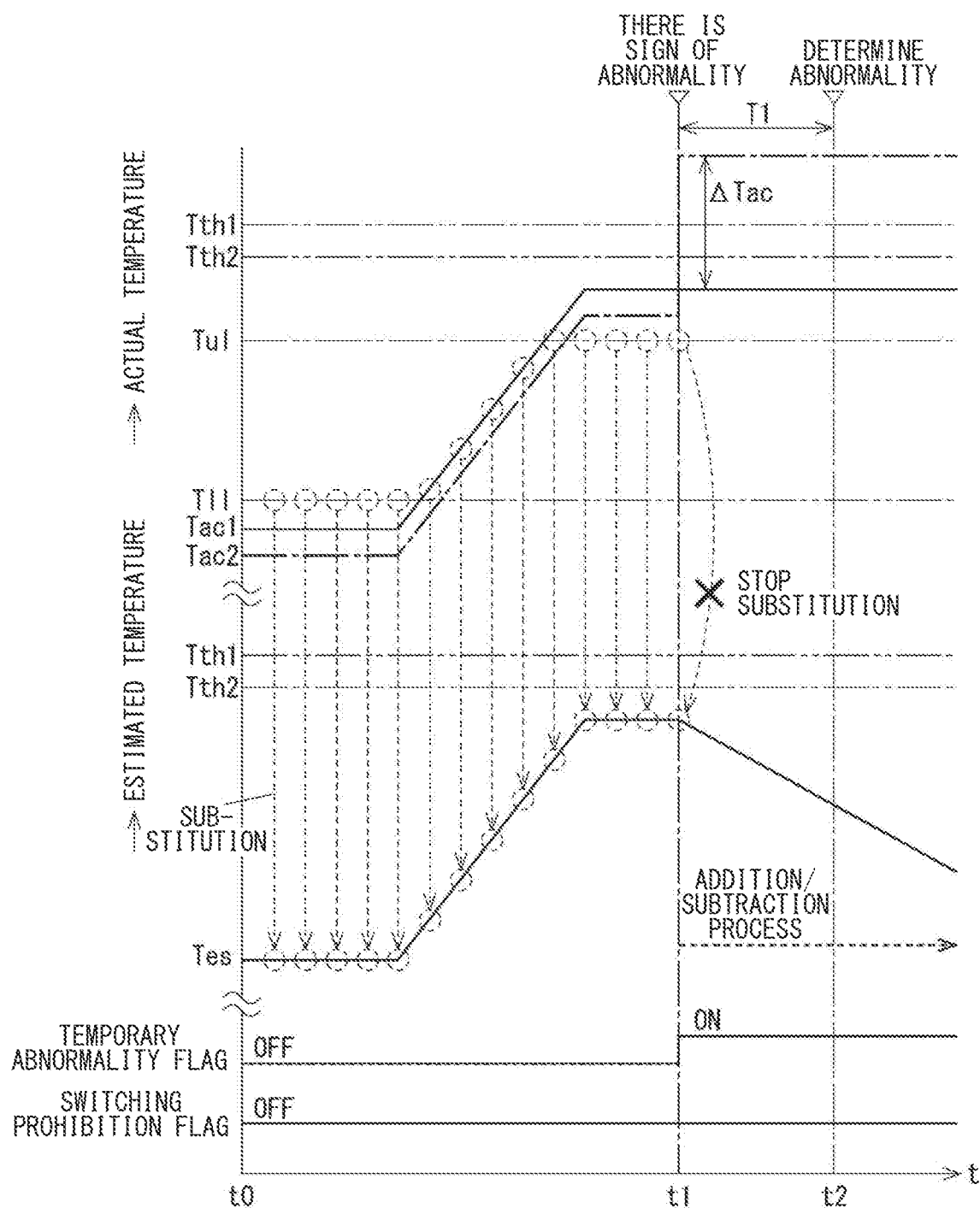
FIG. 6 is a time chart illustrating an example of the operation of the shift range control device of FIG. 5.

In a second embodiment, the temperature estimation unit 822 shown in FIG. 5 provides an upper limit value Tul and a lower limit value Tll as shown in FIG. 6 when the latest actual temperature Tac is substituted into the estimated temperature Tes. By setting the upper limit value Tul, it is possible to prevent the P range from being incapable of switching when the determination temperature Tde is switched to the estimated temperature Tes immediately after the substitution. By setting the lower limit value Tll, it is possible to prevent the device from being damaged due to a difference between the estimated temperature Tes and the actual temperature Tac due to the increase in the atmospheric temperature after substitution.

Third Embodiment

Figure 7:
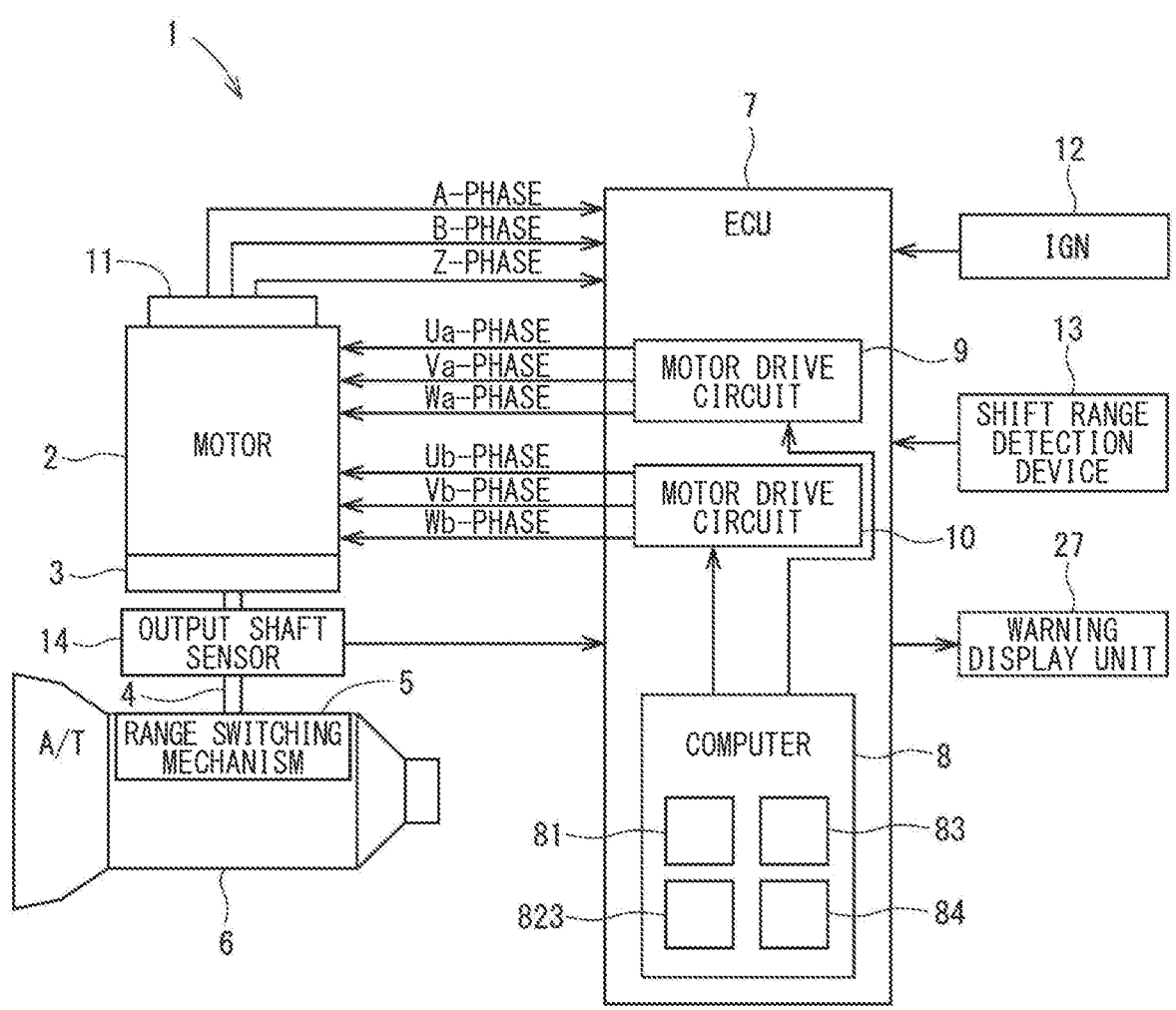
FIG. 7 is a diagram showing a shift range control device according to a third embodiment.

In a third embodiment, when it is determined that there is no sign of abnormality in the temperature detection unit 81, the temperature estimation unit 823 shown in FIG. 7 substitutes the latest actual temperature Tac into the estimated temperature Tes, and then performs the addition/subtraction process of the estimated temperature Tes according to the energized state of the motor 2. In this way, the addition/subtraction process may be performed after the substitution process.

Fourth Embodiment

Figure 8:
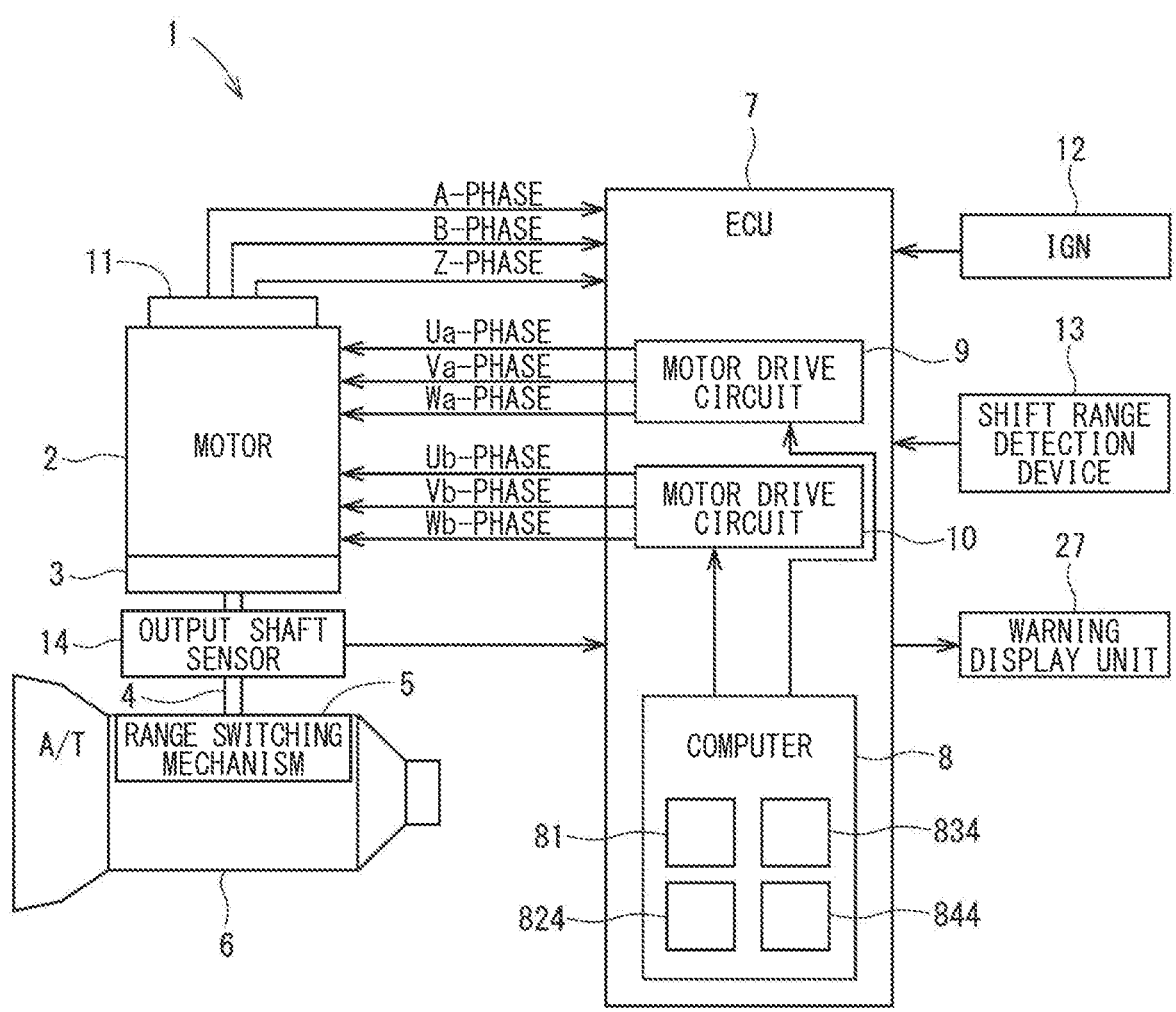
FIG. 8 is a diagram showing a shift range control device according to a fourth embodiment.

In a fourth embodiment, the switching prohibition unit 844 and the temperature estimation unit 824 shown in FIG. 8 performs process using the actual temperature Tac by the thermistor (hereinafter referred to as normal temperature element) whose output value does not match a predetermined upper limit value (for example, 5V) or lower limit value (for example, 0V) among the two thermistors. That is, when the output value of one thermistor sticks to the upper limit value or the lower limit value, the actual temperature Tac by the other thermistor is used. When all the output values of the two thermistors stick to the upper limit value or the lower limit value, the abnormality determination unit 834 determines that there is a sign of abnormality in the temperature detection unit 81. Even if a sign of abnormality occurs in one thermistor in this way, if the other thermistor is normal, the process may be continued using the actual temperature Tac by the other thermistor.

Other Embodiments

In another embodiment, the temperature detection unit may have one temperature element or three or more temperature elements. In another embodiment, the actual temperature used by the temperature estimation unit for processing is not limited to the highest temperature detected by the plurality of thermistors, and may be, for example, an average value.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

What is claimed is:

1. A shift range control device that controls a motor connected to a shift range switching mechanism and switches a shift range of a vehicle, comprising:
   a temperature detection unit configured to detect an actual temperature of the shift range control device;
   a temperature estimation unit configured to calculate an estimated temperature of the shift range control device;
   an abnormality determination unit configured to determine presence or absence of a sign of an abnormality in the temperature detection unit, and
   a switching prohibition unit configured to prohibit the shift range switching when there is no sign of abnormality in the temperature detection unit and the actual temperature is equal to or higher than a predetermined switching prohibition threshold, and configured to prohibit the shift range switching when there is the sign of abnormality in the temperature detection unit and the estimated temperature is equal to or higher than the switching prohibition threshold,
   wherein
   a period when it is determined that there is no sign of abnormality in the temperature detection unit is defined as a normal period, and
   the temperature estimation unit calculates the estimated temperature based on a latest actual temperature in the normal period.

2. The shift range control device according to claim 1, wherein
   when it is determined that there is no sign of abnormality in the temperature detection unit, the temperature estimation unit substitutes the latest actual temperature into the estimated temperature, and
   when it is determined that there is the sign of abnormality in the temperature detection unit, without substituting the actual temperature into the estimated temperature, the temperature estimation unit adds a rising temperature of the shift range control device due to an energization of the motor to the estimated temperature or subtracts a falling temperature of the shift range control device due to a non-energization of the motor from the estimated temperature according to an energized state of the motor.

3. The shift range control device according to claim 1, wherein
   when it is determined that there is no sign of abnormality in the temperature detection unit, after substituting the actual temperature into the estimated temperature, the temperature estimation unit adds a rising temperature of the shift range control device due to an energization of the motor to the estimated temperature or subtracts a falling temperature of the shift range control device due to a non-energization of the motor from the estimated temperature according to an energized state of the motor, and
   when it is determined that there is the sign of abnormality in the temperature detection unit, without substituting the actual temperature into the estimated temperature, the temperature estimation unit adds the rising temperature of the shift range control device due to the energization of the motor to the estimated temperature or subtracts the falling temperature of the shift range control device due to the non-energization of the motor from the estimated temperature according to the energized state of the motor.

4. The shift range control device according to claim 1, wherein
the temperature detection unit has a plurality of temperature elements, and
the temperature estimation unit calculates the estimated temperature based on a highest actual temperature among the latest actual temperatures of the plurality of temperature elements in the normal period.

5. The shift range control device according to claim 1, wherein
the temperature detection unit has a plurality of temperature elements, and
the abnormality determination unit determines that there is the sign of abnormality in the temperature detection unit when a difference between two actual temperatures of the plurality of temperature elements is equal to or greater than a predetermined abnormality determination value.

6. The shift range control device according to claim 1, wherein
the temperature detection unit has a plurality of temperature elements, and
a temperature element whose output value does not match a predetermined upper limit value or lower limit value among the plurality of temperature elements is defined as a normal temperature element,
the switching prohibition unit and the temperature estimation unit perform a process using the actual temperature of the normal temperature element, and
when all the output values of the plurality of temperature elements match the upper limit value or the lower limit value, the abnormality determination unit determines that there is the sign of abnormality in the temperature detection unit.

7. The shift range control device according to claim 1, wherein
the abnormality determination unit determines an abnormality state of the temperature detection unit when the state in which there is the sign of abnormality of the temperature detection unit continues for a predetermined time or more.

8. A shift range control device that controls a motor connected to a shift range switching mechanism and switches a shift range of a vehicle, comprising:
a motor drive circuit configured to drive the motor;
a temperature element configured to detect an actual temperature of the shift range control device; and
a computer including a processor and a memory that stores instructions configured to, when executed by the processor, cause the processor to
detect the actual temperature of the shift range control device by the temperature element,
calculate an estimated temperature of the shift range control device,
determine a presence or absence of a sign of an abnormality in the temperature element,
prohibit the shift range switching when there is no sign of abnormality in the temperature element and the actual temperature is equal to or higher than a predetermined switching prohibition threshold, and configured to prohibit the shift range switching when there is the sign of abnormality in the temperature element and the estimated temperature is equal to or higher than the switching prohibition threshold, and
calculate the estimated temperature based on a latest actual temperature in a normal period, assuming that the period in which it is determined that there is no sign of abnormality in the temperature element is the normal period.

9. The shift range control device according to claim 8, wherein
the computer causes the processor to
substitute the latest actual temperature into the estimated temperature, when it is determined that there is no sign of abnormality in the temperature element, and
when it is determined that there is the sign of abnormality in the temperature element, without substituting the actual temperature into the estimated temperature,
add a rising temperature of the shift range control device due to an energization of the motor to the estimated temperature or
subtract a falling temperature of the shift range control device due to a non-energization of the motor from the estimated temperature according to an energized state of the motor.

10. The shift range control device according to claim 8, wherein
the computer causes the processor to
when it is determined that there is no sign of abnormality in the temperature element, after substituting the actual temperature into the estimated temperature,
add a rising temperature of the shift range control device due to an energization of the motor to the estimated temperature or
subtract a falling temperature of the shift range control device due to a non-energization of the motor from the estimated temperature according to an energized state of the motor, and
when it is determined that there is the sign of abnormality in the temperature element, without substituting the actual temperature into the estimated temperature,
add the rising temperature of the shift range control device due to the energization of the motor to the estimated temperature or
subtract the falling temperature of the shift range control device due to the non-energization of the motor from the estimated temperature according to the energized state of the motor.

11. The shift range control device according to claim 8, wherein
the computer causes the processor to
calculate the estimated temperature based on a highest actual temperature among latest actual temperatures of a plurality of temperature elements in the normal period.

12. The shift range control device according to claim 8, wherein
the computer causes the processor to
determine that there is the sign of abnormality in the temperature element when a difference between two actual temperatures of a plurality of temperature elements is equal to or greater than a predetermined abnormality determination value.

13. The shift range control device according to claim 8, wherein
a temperature element whose output value does not match a predetermined upper limit value or lower limit value among a plurality of temperature elements is defined as a normal temperature element, the computer causes the processor to perform a process using the actual temperature of the normal temperature element, and when all the output values of the plurality of temperature elements match the upper limit value or the lower limit value, determine that there is the sign of abnormality in the temperature element.

14. The shift range control device according to claim 8, wherein the computer causes the processor to determine an abnormality state of the temperature element when the state in which there is the sign of abnormality of the temperature element continues for a predetermined time or more.

* * * * *